United States Patent [19]
Suzuki et al.

[11] Patent Number: 5,352,159
[45] Date of Patent: Oct. 4, 1994

[54] CHAIN TENSIONER WITH OIL RESERVOIR

[75] Inventors: Tadasu Suzuki, Chicopee, Mass.; Shigekazu Fukuda, Tokorozawa, Japan

[73] Assignee: Tsubakimoto Chain Co., Japan

[21] Appl. No.: 156,069

[22] Filed: Nov. 23, 1993

[30] Foreign Application Priority Data

Nov. 27, 1992 [JP] Japan .................. 4-087211[U]

[51] Int. Cl.$^5$ ............................... F16H 7/00
[52] U.S. Cl. .................................... 474/110
[58] Field of Search .................. 474/101, 109–111, 474/117, 135, 138

[56] References Cited

U.S. PATENT DOCUMENTS

| | | |
|---|---|---|
| 4,911,679 | 3/1990 | Inoue et al. |
| 5,248,282 | 9/1993 | Suzuki . |
| 5,314,388 | 5/1994 | Suzuki et al. .................. 474/110 |

*Primary Examiner*—Michael P. Buiz
*Attorney, Agent, or Firm*—Howson and Howson

[57] ABSTRACT

In an oil-operated tensioner for the timing chain of an internal combustion engine, a plunger slidable in a bag-shaped cylinder open at one end, divides the cylinder into a high pressure chamber on the side of the plunger opposite to the open end, and a low pressure chamber on the other side of the plunger. A seal at the open end surrounds a piston rod connected to the plunger. A check valve allows free flow from the low pressure chamber to the high pressure chamber so that the plunger can move rapidly in the projecting direction. A restricted passage allows only slow flow of oil in the opposite direction to prevent rapid retracting movement of the plunger. An oil reservoir, formed as an integral part of a housing of the tensioner or by an outer housing surrounding the cylinder, has a passage in communication with the low pressure chamber and an opening for collecting oil from the oil mist within the engine and surrounding the tensioner. Working oil for the tensioner is replenished from the oil mist, and leakage of oil from the high pressure chamber is prevented even when the engine is shut down.

1 Claim, 5 Drawing Sheets

CHAIN TENSIONER WITH OIL RESERVOIR

BRIEF SUMMARY OF THE INVENTION

This invention relates to chain tensioners, and more particularly to improvements in fluid tensioners of the type used to maintain tension in the timing chain of an internal combustion engine and located in an enclosure containing an oil mist.

A typical chain tensioner in accordance with the prior art comprises a housing and a slidable plunger defining an internal oil chamber. The plunger applies a tensioning force to a chain through a shoe or chain guide. A projecting force is imparted to the plunger by pressure applied to the oil in the internal chamber, and also by a spring located within the oil chamber. When the tension in the chain decreases, a check valve allows oil to flow into the oil chamber, and the plunger moves in the projecting direction to reestablish proper tension in the chain. When the tension in the chain increases, the check valve closes, and the oil in the oil chamber prevents the plunger from retracting rapidly. If a high level of tension is maintained in the chain, oil is slowly returned to an oil reservoir through a restricted orifice.

The oil chamber must be sealed by a seal between the housing and the plunger in order to prevent undesired retracting movement of the chain. However, because of the pressure applied to the oil in the oil chamber, the seal cannot completely prevent oil from leaking out of the oil chamber.

Such leakage of oil causes premature retracting movement of the plunger, which prevents the tension in the chain from being maintained at a substantially constant level. Another disadvantage of the conventional tensioner is that, when the engine is stopped and external pressure is consequently no longer applied to the oil in the tensioner, oil will still leak, and the plunger will move in the retracting direction. Therefore, when the engine is restarted, the tension in the chain will be below the proper level, and the chain will flutter, producing excessive noise.

In accordance with the invention, leakage of oil is eliminated by sealing of an oil chamber in such a way as to prevent loss of oil as a result of the retracting movement of the plunger. Also, in accordance with the invention, since an oil mist is present in the environment in which the tensioner is used, the oil mist is utilized to replenish the working oil for the tensioner.

The chain tensioner in accordance with the invention comprises a housing having first and second ends, and means defining a wall extending between the first and second ends. The housing defines a cylindrical internal oil chamber, and is closed at its first end and has an opening at its second end. A plunger is located within the oil chamber, and has two sides, one side of the plunger facing the opening at the second end of the oil chamber and the other side of the plunger facing the first end of the oil chamber. The plunger divides the oil chamber into a low pressure chamber on the side thereof facing the opening and a high pressure chamber on the opposed side thereof. A rod extends from the plunger and projects through the opening. Spring means are provided for imparting a projecting force to the plunger, urging the plunger in a direction toward the open end of the housing. Sealing means are provided between the wall of the housing and the rod on the one side of the plunger, whereby the low pressure chamber is located between the seal means and the plunger. The tensioner includes an oil reservoir having an oil collecting port, and means interconnecting the oil reservoir with the low pressure chamber. A restricted oil passage is formed between the low pressure chamber and the high pressure chamber, and a second oil passage is provided between the low pressure chamber or the oil reservoir and the high pressure chamber. A check valve in the second oil passage allows flow of oil into the high pressure chamber while preventing flow of oil out of the high pressure chamber through the second oil passage.

When the tension in the chain decreases, the plunger moves in the projecting direction, and oil in the low pressure chamber is allowed to flow into the high pressure chamber through the check valve in the second oil passage. When the tension in the chain increases, the check valve is closed, so that the oil in the high pressure chamber prevents rapid retracting movement of the plunger.

In accordance with the invention, since the housing has an opening only at one end, the portion of the housing defining the high pressure chamber has a bag-like shape. Even when the tension of the chain increases and a high pressure is applied to the oil in the high pressure chamber, the oil cannot escape from the high pressure chamber except through the first oil passage. Consequently, the plunger retracts slowly. The high pressure chamber does not need to be sealed. This makes it possible to prevent the leakage of the oil almost perfectly.

The transverse cross-sectional area of the low pressure chamber is different from that of the high pressure chamber because of the presence of the rod in the low pressure chamber. The oil reservoir accommodates the change in the capacities of the low pressure chamber and the high pressure chamber due to the advancing and retracting motion of the plunger. Since the chain tensioner is used in the presence of an oil mist, working oil for the tensioner can be obtained from the mist. The oil mist is collected in the oil reservoir through the oil collecting port, so that working oil is constantly replenished.

DETAILED DESCRIPTION

Figure 7:
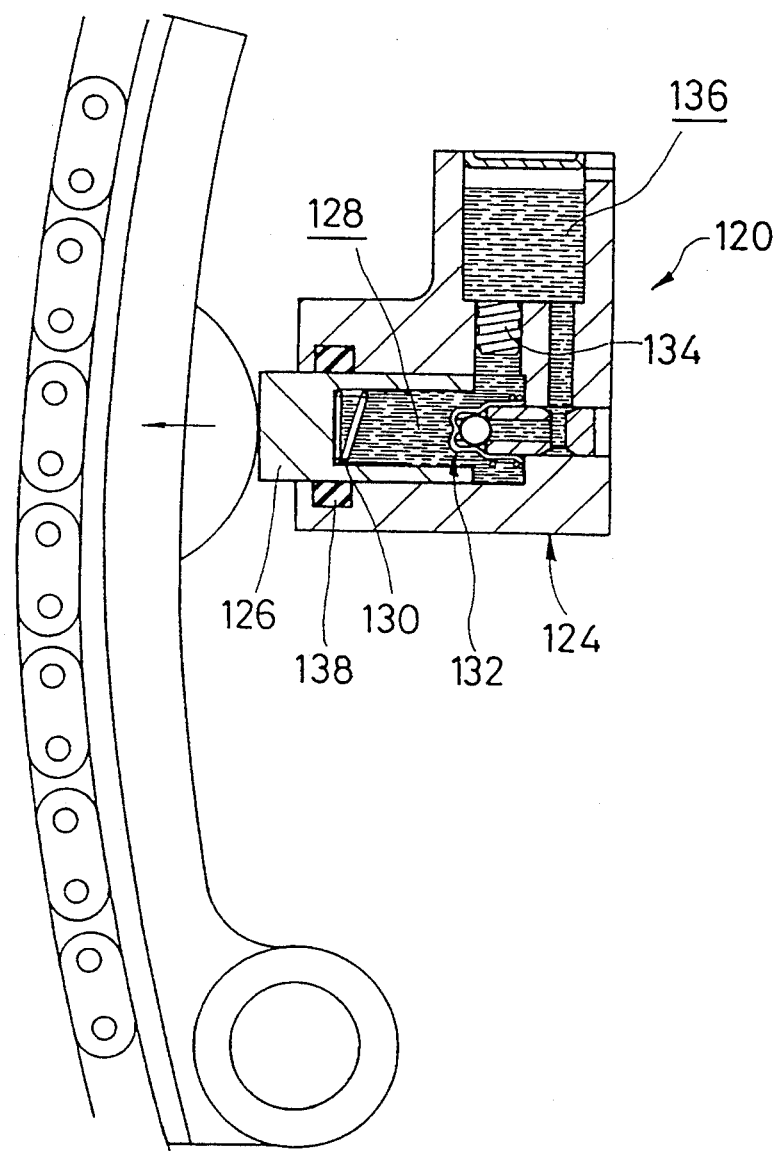
FIG. 7 is an axial section of a prior art chain tensioner.

As shown in FIG. 7, a chain tensioner 120, in accordance with the prior art, comprises a housing 124 and a slidable plunger 126, defining an internal oil chamber 128. A projecting force is imparted to the plunger 126 by pressure applied externally to the oil in chamber 128, and by a spring 130 located in the oil chamber. When the tension in chain C decreases, a check valve 132 opens to allow oil to flow into the oil chamber 128.

When oil flows into chamber 128, plunger 126 moves in the projecting direction to reestablish proper tension in chain C. When the tension in chain C increases, check valve 132 is closed, and the oil in oil chamber 128 prevents plunger 126 from retracting rapidly. If a high level of tension is maintained in the chain, oil is slowly returned to an oil reservoir 136 through a restricted orifice, typically a helical passage 134. As a result, plunger 126 retracts slowly.

In tensioner 120, the oil chamber 128 must be sealed to prevent retracting movement of chain C. Accordingly, a seal 138 is provided between the housing 124 and the plunger 126. However, the pressure applied to the oil in the oil chamber 128 is high, and consequently it is not possible for seal 138 to prevent oil from leaking out of the oil chamber.

Such leakage of oil causes premature retracting movement of the plunger 126, which prevents the tension in chain C from being maintained at a substantially constant level. Another disadvantage of the tensioner of FIG. 7 is that, when the engine is stopped and external pressure is consequently no longer applied to the oil in the tensioner, oil will still leak, and the plunger 126 will move in the retracting direction. Therefore, when the engine is restarted, the tension in chain C will be below the proper level, and chain C will flutter.

Figure 1:
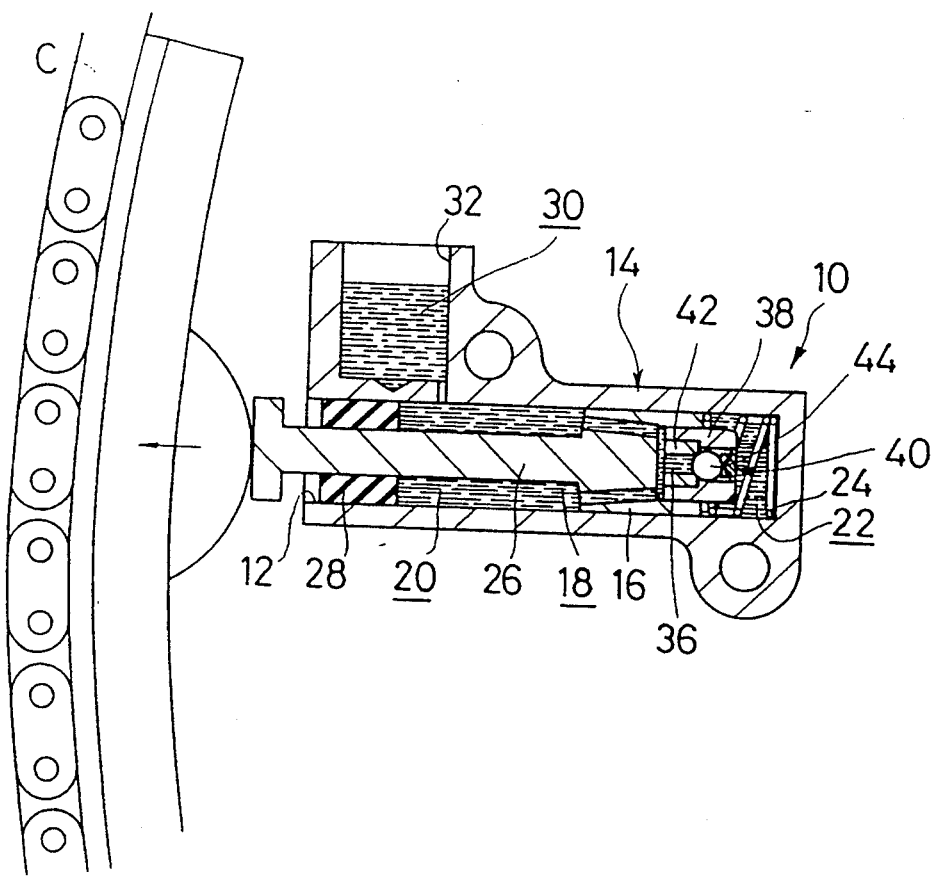
FIG. 1 is an axial section of a tensioner in accordance with a first embodiment the invention.
Figure 2:
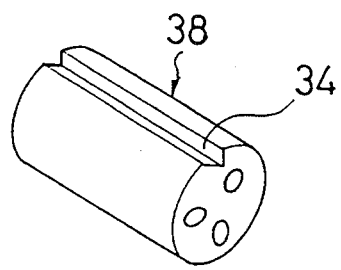
FIG. 2 is a perspective view of a plug used in the tensioner of FIG. 1.

In FIGS. 1 and 2, tensioner 10 is used to maintain tension in a chain C, which transmits power between two sprockets (not shown) which are vertically spaced apart from each other. The tensioner 10 comprises a housing 14, which is open only at one end, the opening being indicated at 12. A plunger 16 is slidable in the housing 14. An oil chamber 18 is formed in the housing 14. The plunger 16 divides the oil chamber 18 into a low pressure chamber 20 on the opening side, and a high pressure chamber 22 on the opposite side. The high pressure chamber 22 is closed by the housing 14 and the plunger 16, so that the oil cannot escape. Spring 24 imparts a projecting force to the plunger 16.

The plunger 16 has a rod 26 on the side facing opening 12. A seal 28 is provided between the housing 14 and the rod 26 adjacent to opening 12. The housing 14 and an oil reservoir 30 are formed as a unit. The oil reservoir is interconnected with the low pressure chamber 20. The oil reservoir 30 also has an open collecting port 32 to receive oil from the oil mist in the space in which the tensioner is located.

The tensioner 10 has a oil passage extending between the high pressure chamber 22 and the low pressure chamber 20. This oil passage comprises a cut-out groove 34 formed in the outer periphery of a plug 38 press-fit in plunger 16. This passage is restricted so that, oil, because of its viscosity, can flow through it only at a very low rate from the high pressure chamber to the low pressure chamber. A second oil passage 36 allows oil to flow freely from the low pressure chamber 20 to the high pressure chamber 22.

When an external force is applied to the plunger 16 to urge the plunger in the retracting direction, the oil in high pressure chamber 22 is allowed to flow slowly into the low pressure chamber 20 through groove 34. A check valve 40 is provided in the second oil passage 36. The check valve 40 includes a ball seat 42, a ball 44 and a spring (not shown), which allows oil to flow freely from the low pressure chamber 20 to the high pressure chamber 22, but which prevents flow of oil through passage 36 in the opposite direction.

To explain the operation of tensioner 10, it may be assumed that the tensioner is used to maintain tension in a timing chain C of an internal combustion engine. Lubricating oil required for the operation of chain C is present in the engine block as an oil mist generated as a result of movement of the crank and the chain. The oil mist is collected in the oil reservoir 30 through the collecting port 32. The oil thus collected in the reservoir 30 functions as working oil for the tensioner 10.

When the tension in chain C decreases, its plunger 16 moves in the projecting direction, and oil is allowed to flow rapidly from the low pressure chamber 20 to the high pressure chamber 22 through check valve 40. Because of the presence of the rod 26 in the low pressure chamber 20, the cross-sectional area of the low pressure chamber 20 is different from that of the high pressure chamber 22. Consequently, the volume of the high pressure chamber increases by an amount which exceeds the decrease in volume of the low pressure chamber. In other words, as the plunger moves in the projecting direction, the combined volume of the low and high pressure chambers increases. Oil is allowed to flow from the oil reservoir 30 to the low pressure chamber 20, and from the low pressure chamber, through check valve 40, to the high pressure chamber 22. Thus, the oil reservoir accommodates the change in the combined capacities of the low pressure chamber 20 and the high pressure chamber 22.

When the tension in chain C increases, the force applied to the plunge 16 by the chain urges the plunger in the retracting direction. The check valve 40 closes, and the oil in the high pressure chamber 22 withstands this force. When the high level of chain tension is sustained, the oil in the high pressure chamber 22 is allowed to flow slowly into the low pressure chamber 20 through the oil passage provided by cut-out groove 34, so that the plunger 16 gradually retracts. The oil in the low pressure chamber 20 is allowed to flow into the oil reservoir 30 as the plunger 16 retracts.

The high pressure chamber 22 is formed in a bag-like shape. Consequently, the oil cannot escape from the high pressure chamber except through oil passage 34. When a large external force urges the plunger 16 in the retracting direction, and the oil in chamber 22 is under high pressure, the oil will not leak. Furthermore oil will not leak even when the engine is stopped.

Figure 3:
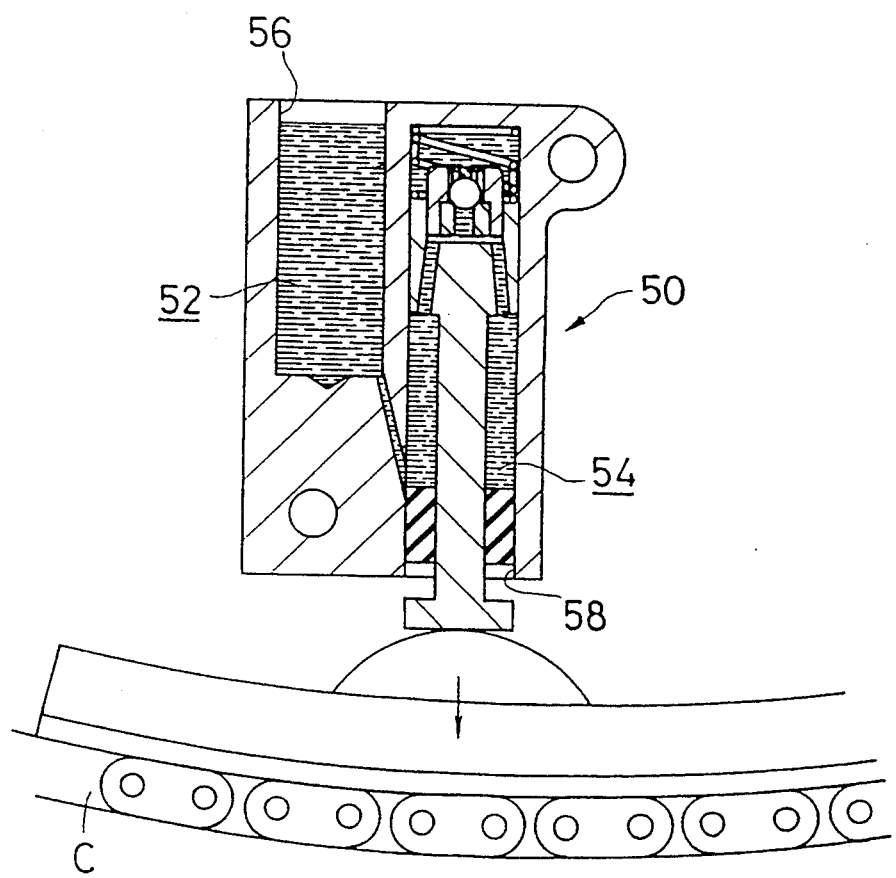
FIG. 3 is an axial section of a tensioner in accordance with a second embodiment the invention.

FIG. 3 shows a second embodiment of the invention, in which a tensioner 50 is arranged to maintain tension in a chain C, which transmits power between a pair of sprockets (not shown) horizontally spaced apart from each other. The tensioner 50 is similar in construction to the tensioner shown in FIG. 1, the principal difference being that, in the embodiment of FIG. 3, the oil reservoir 52 is disposed in parallel to the oil chamber 54, so that the collecting port 56 of the oil reservoir is open on the side opposed to the opening 58 of the oil chamber 54 through which the rod extends. The oil mist is collected in oil reservoir 52 through port 56. The operation of the tensioner of FIG. 3 is essentially the same as that of the tensioner of FIG. 1.

Figure 4:
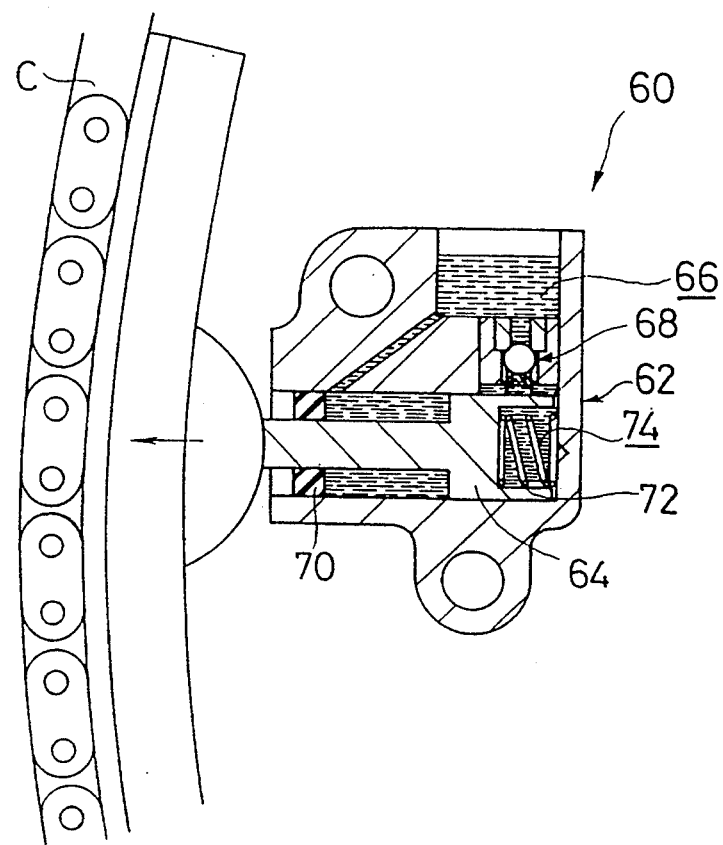
FIG. 4 is an axial section of a tensioner in accordance with a third embodiment the invention.

In the third embodiment of the invention, as shown in FIG. 4, tensioner 60 maintains tension in a chain C, which transmits power between two sprockets (not shown) which are vertically spaced apart from each other. Housing 62 is provided with a plunger 64, an upwardly open, oil mist-collecting oil reservoir 66, a check valve 68, a seal 70 surrounding a rod extending from the plunger, and a spring 72 arranged to urge the plunger in a projecting direction. A high pressure chamber 74 is formed on the side of plunger 64 opposite to the side from which the rod extends. The oil reservoir is in direct communication with a low pressure chamber on the side of the plunger from which the rod extends. In this tensioner, both a restricted first oil passage, and a second oil passage provided with check valve 68, are provided between the high pressure chamber 74 and the oil reservoir 66, to allow rapid projecting movement of the plunger, while allowing only a slow retracting movement.

Figure 5:
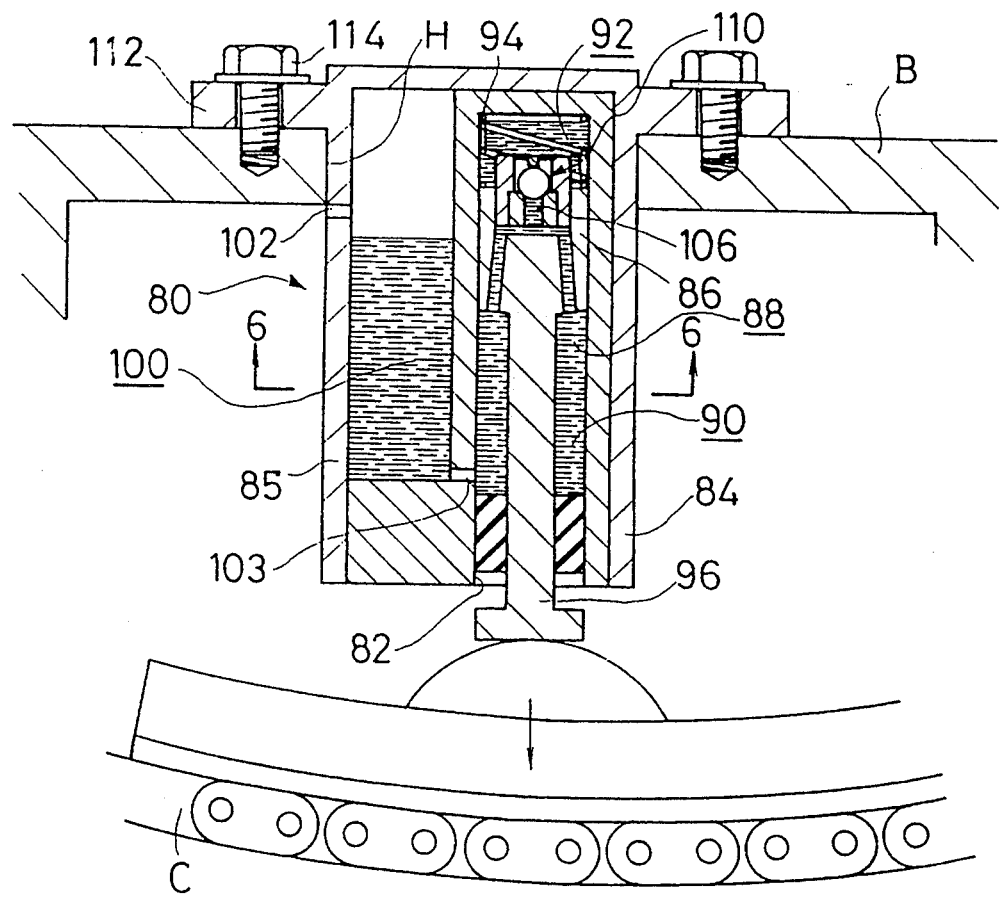
FIG. 5 is an axial section of a tensioner in accordance with a fourth embodiment the invention.
Figure 6:
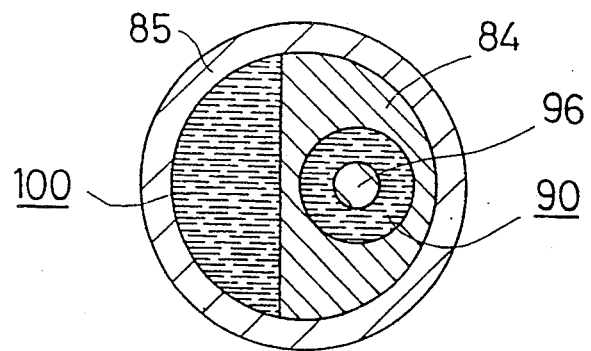
FIG. 6 is a sectional view taken on plane 6—6 of FIG. 5.

In the fourth embodiment of the invention, as shown in FIGS. 5 and 6, a tensioner 80 is arranged to maintain tension in a chain C, which transmits power between sprockets (not shown) which are vertically or horizontally spaced apart from each other. This tensioner includes a first housing 84, which is open only at opening 82 provided at one end, a plunger 86, slidable in the first housing 84, and a second housing 85, which contains the first housing 84. An oil chamber 88 is formed in the first housing 84, and the plunger 86 divides the oil chamber 88 into a low pressure chamber 90 on the side of the plunger nearest the opening 82, and a high pressure chamber 92 on the opposite side of the plunger. The high pressure chamber 92 is enclosed by the first housing 84 and plunger 86, so that the oil cannot escape from it.

The plunger 86 has a rod 96 on the side facing the opening 82 of the housing. The rod extends through the opening, and seal 98 is provided between the housing 84 and the rod 96. An oil reservoir 100 is formed between the first housing 84 and the second housing 85. The oil reservoir 100 has a collecting port 102 formed in the wall of the second housing 85, and an interconnecting hole 103 formed on the first housing 84. The interconnecting hole 103 provides restricted fluid communication between the oil reservoir 100 and the low pressure chamber 90.

A spring 94, a restricted first oil passage (not shown), a second oil passage 106, and a check valve 110 correspond to similar parts in the embodiment of FIG. 1.

The second housing 85 has a mounting flange 112 on the side opposite from opening 82. The tensioner 80 can be mounted on an engine by inserting the second housing 85 into a hole H formed in engine block B, and securing the flange 112 to the engine block B by means of bolts 114.

The collecting port 102 in the tensioner of this embodiment is relatively small, and is spaced apart from and opposed to the interconnecting hole 103 in the longitudinal direction of the second housing 85. Accordingly, the tensioner may be mounted as shown in FIG. 5, or mounted with the axis of movement of the plunger rotated by as much as 90° clockwise from the position shown in FIG. 5. In either case, the oil collected in the reservoir 100 from the oil mist surrounding the tensioner can flow through hole 103 into and out of the oil reservoir.

In each of the embodiments described, oil from the oil mist present in an engine is collected and held in the oil reservoir of the tensioner, for use as working oil. It is unnecessary to provide an interconnection between the tensioner and the pressurized engine oil circulation system, or between the tensioner and any other source of external oil pressure. Accordingly, the invention simplifies the supplying of oil to the tensioner, and reduces the capacity requirements of the engine oil pump.

In each embodiment of the tensioner, the high pressure chamber is formed in a bag-like shape on the side opposite from the opening of the housing. Thus, it is unnecessary to provide a seal between the high pressure chamber and the exterior of the housing, and leakage of oil from the high pressure chamber is prevented. Accordingly, even when the engine is left as unused for a long period of time, oil does not leak, and it is possible to restart the engine without fluttering of the chain and without generation of excessive noise.

We claim:

1. A chain tensioner comprising:

a housing having first and second ends, and means defining a wall extending between said ends, said housing defining an internal oil chamber and being closed at said first end and having an opening at said second end;

a plunger located within the oil chamber, and having two sides, one side of the plunger facing the opening at the second end of the oil chamber and the other side of the plunger facing said first end of the oil chamber, and said plunger dividing the oil chamber into a low pressure chamber on the side thereof facing the opening and a high pressure chamber on the opposed side thereof;

a rod extending from said plunger and projecting through said opening;

spring means for imparting a projecting force to said plunger, urging the plunger in a direction toward said opening;

means providing a seal between said wall of the housing and said rod on said one side of the plunger whereby the low pressure chamber is located between the seal means and the plunger;

an oil reservoir having an oil collecting port;

means interconnecting said oil reservoir and said low pressure chamber;

a restricted oil passage formed between said low pressure chamber and said high pressure chamber;

means providing a second oil passage between one of said low pressure chamber and said oil reservoir, on the one hand, and said high pressure chamber on the other; and check valve means in said second oil passage for allowing flow of oil into said high pressure chamber while preventing flow of oil out of said high pressure chamber through said second oil passage.

* * * * *